(No Model.)
C. J. SCHOENING.
TEA KETTLE.
No. 283,287. Patented Aug. 14, 1883.
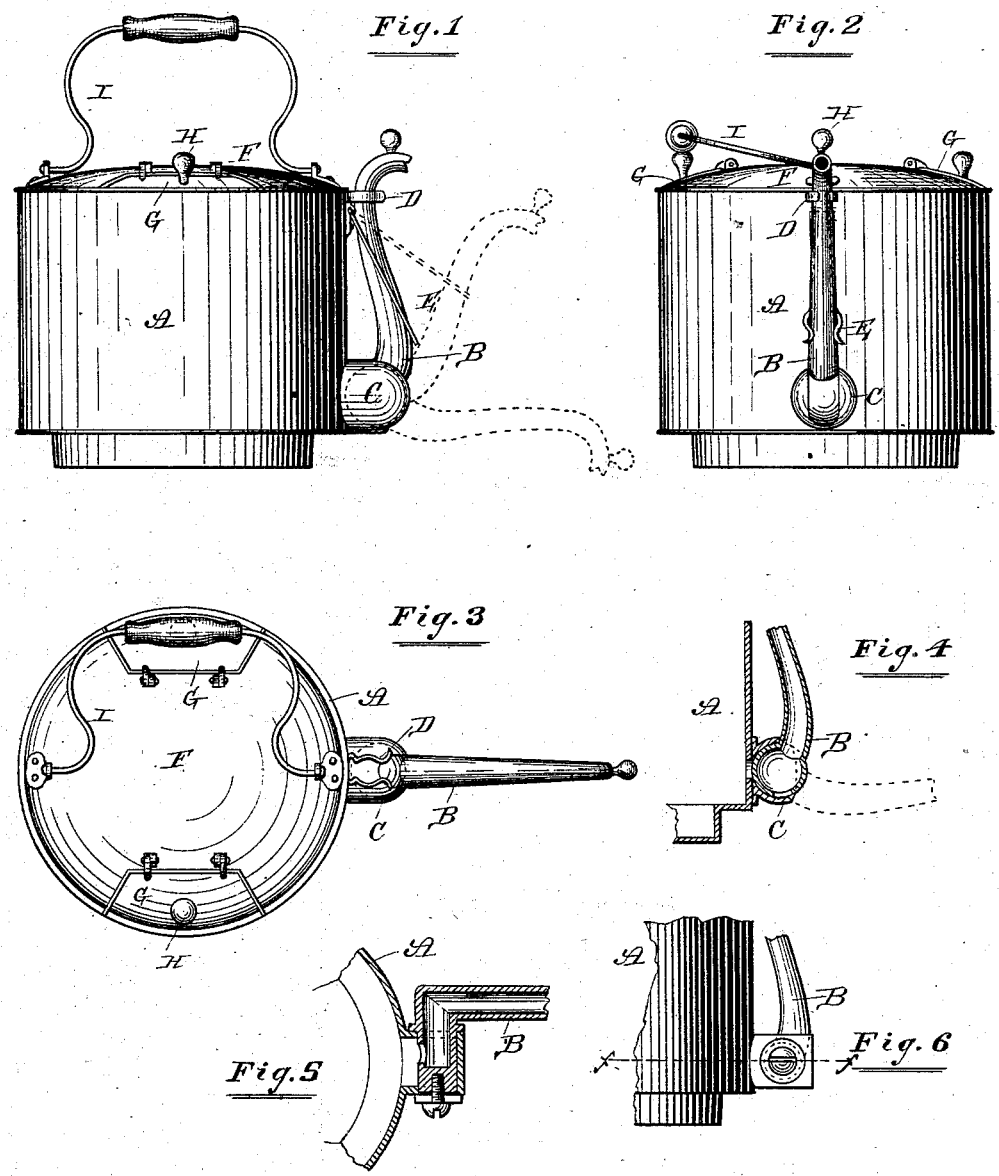

UNITED STATES PATENT OFFICE.

CHARLES J. SCHOENING, OF CHICAGO, ILLINOIS.

TEA-KETTLE.

SPECIFICATION forming part of Letters Patent No. 283,287, dated August 14, 1883.

Application filed June 7, 1883. (No model.)

*To all whom it may concern:*

Be it known that I, CHARLES J. SCHOENING, of Chicago, in the county of Cook and State of Illinois, have invented certain new and useful Improvements in Tea-Kettles; and I do hereby declare the following to be a full, clear, and exact description of the invention, such as will enable others skilled in the art to which it pertains to make and use it, reference being had to the accompanying drawings, which form part of this specification.

My invention relates to an improvement in kettles; and it consists in the combination of the kettle with a spout that is pivoted thereto, and provided with a holder near its top, and a wire or catch, which prevents the spout from being lowered beyond a certain point; and it still further consists in forming the kettle with doors upon opposite sides of the lid, which doors are provided with knobs of non-conducting material upon which the handle of the bail is adapted to rest, and thus prevented from getting hot, all to be more fully set forth hereinafter.

In the accompanying drawings, Figure 1 is a side elevation of my invention. Fig. 2 is an end elevation thereof; Fig. 3, a top plan view; Fig. 4, a detailed section of the spout, showing its connection to the kettle. Figs. 5, 6 illustrate modifications thereof.

A represents a kettle, to the lower portion of which is secured a spout, B, either by means of a ball-and-socket joint, as shown at C, or by a connection shown in Figs. 5, 6, as may be preferred; or other modes of attaching said spout to the kettle may be employed. This spout is thus adapted to be raised or lowered, as illustrated in dotted lines in Figs. 1 and 4. When lowered, water may be drawn from the kettle without removing the latter from the stove. In order to hold the spout in an elevated position, I provide the spring-catch D, as shown. A spring-wire, E, may be also employed, if desired, to maintain the spout at an angle of about thirty degrees from the perpendicular, as illustrated in Fig. 1.

F represents the lid, which is provided with the doors G, hinged to it at opposite sides, which doors are each provided with the knobs H, of non-conducting material. The bail I is pivotally secured to the center of the cover, and is of such a size as to be caused to normally rest upon one of the knobs H, thus preventing the handle, with which the bail is provided, from becoming too hot to be taken hold of by the hand.

A kettle thus constructed will be found of great practical utility in the household.

Having thus described my invention, I claim—

1. The combination of the kettle provided with a suitable catch, D, the pivoted spout B, and a wire or catch, E, substantially as shown.

2. A kettle provided with a pivoted spout, a spring or other device for holding said spout in an elevated position, a cover having doors hinged to opposite sides thereof, said doors being provided with knobs of non-conducting material, and a bail that is pivoted in the center of the cover, and is adapted to normally rest upon one of the knobs of the doors, all combined and arranged to operate substantially in the manner and for the purpose set forth.

In testimony whereof I affix my signature in presence of two witnesses.

CHARLES J. SCHOENING.

Witnesses:
A. B. TALLMAN,
W. V. JOHNSTON.